April 30, 1957 J. P. WESTON 2,790,853

SIGNALLING SYSTEM FOR A MANUAL CORDLESS TYPE SWITCHBOARD

Filed Feb. 1, 1954 2 Sheets-Sheet 1

INVENTOR.
JOSEPH P. WESTON
BY T. L. Bowes
ATTORNEY

SIGNALLING SYSTEM FOR A MANUAL CORDLESS TYPE SWITCHBOARD

Filed Feb. 1, 1954

2 Sheets-Sheet 2

INVENTOR.
JOSEPH P. WESTON
BY T. L. Bowes
ATTORNEY

United States Patent Office 2,790,853
Patented Apr. 30, 1957

2,790,853

SIGNALLING SYSTEM FOR A MANUAL CORDLESS TYPE SWITCHBOARD

Joseph P. Weston, Rochester, N. Y., assignor, by mesne assignments, to General Dynamics Corporation, a corporation of Delaware Application February 1, 1954, Serial No. 407,453

8 Claims. (Cl. 179—27)

The present invention relates to manual, cordless type telephone switchboards and more particularly to systems utilizing such switchboards for providing supervisory signals.

In the past, manual cordless switchboards have been made which were equipped to provide terminations for lines of two classes. An example of this is to be found in the cordless type switchboard commonly used in small private branch exchange systems where extension lines and trunk lines to the central office form the first and second classes of lines, respectively. In such a switchboard, the supervisory system requirements are comparatively simple; the system must supply a first system or pattern of supervision on calls extended between any two extension stations, and a second system on calls extended between any number of stations and the central office. In this comparatively simple system, the switching mechanism used to effect the choice of supervision systems is controlled by the switching device associated with each of the group of trunk terminations in which the lines of the central office trunk class are terminated. However, when three or more such classes of lines are terminated at a switchboard and a system of signals unique to calls between two different classes of lines is required, the elementary switching technique referred to above fails. This failing has made it necessary to provide a larger, more expensive switchboard of either manual or dial type to meet the requirements of private branch exchange systems of the latter type.

Accordingly, it is an object of my invention to provide a new and improved manual, cordless type switchboard.

It is another object of my invention to provide a new and improved cordless type switchboard equipped with groups of terminations for a plurality of classes of lines.

Another object of my invention is to provide a supervisory signal of the type set forth above in which the controlling means of an unlimited number of lines of one or more particular classes may be connected in a conference arrangement with at least one of each lines of the other types without changing the character of the supervisory signalling system that is unique to a conference arrangement that includes only one of each of the said particular classes of line.

I have accomplished the above stated objects by providing in a cordless type switchboard equipped for terminating a plurality of different classes of lines groups of terminating circuits, each circuit in each group corresponding to one of the lines of the class of line which terminate in the particular group. In each terminating circuit, equipment is provided for use in the signalling systems which are unique with the various connections in which the particular class of line terminated by the circuit may be joined. The latter equipment is arranged to be controlled by means of other equipment within the switchboard and within the terminating circuits of the other various groups in accordance with the requirements of the connection being set up.

The foregoing and other objects and features of the present invention will be better understood by referring to the following drawings in which Figs. 1 and 2, when placed with adjacent edges abutting show the relationship of the various components of the system contemplated and the circuitry involved in carrying out my invention.

Referring to the drawings, telephones such as those represented by symbols T2 and T3 are located at extension stations connected to the switchboard by lines such as L2 and L3 which are in a particular class of lines. Telephones such as those represented by the symbol T4 are at stations which have access to the cordless switchboard by way of the private dial branch exchange which is in turn connected to the cordless switchboard by another class of lines such as L4. Telephones such as those represented by the symbol T5 are located at or are connected to lines radiating from the central office which may be manual or dial type. A connection between telephone T5 and the cordless switchboard can be extended by way of the central office over still another class of lines such as L5. The telephone represented by the symbol T1 is located at the cordless switchboard and is used by the switchboard attendant to talk to any of the above-mentioned telephones when they are connected to the switchboard. By means of this system, it is possible to extend connections between any two stations on different extension lines, between any extension station telephone line and any private dial branch line, between any private dial branch exchange line and a central office trunk line, and between any extension station line and any central office trunk line. It is also possible to arrange conference connections that consist of any number of extension station lines and any number of private dial branch exchange lines, and which may include one of the central office trunk lines. While only two of the extension station lines and one each of the private dial branch exchange and central office trunk lines are shown, it is understood that the system embodying my invention will function in the manner described independent of the number of lines individual to each class, and that in practice the number of lines of each class is determined by the traffic conditions of the system required.

Referring to Figs. 1 and 2, the switchboard comprises a plurality of switching devices such as standard, cam type telephone switches or keys, arranged in a matrix across the face of the switchboard. The matrix is formed by vertical ranks of switches such as S130 and S140, the switches in any rank being associated with and forming a part of the terminating equipment of any one line terminating in the switchboard. Each switch in each vertical rank is further positioned so that corresponding switches in each vertical rank form various horizontal ranks or rows; each row so formed having a connecting circuit such as C110 and C120 associated with it. Each of these connecting circuits enables the attendant at the cordless switchboard to interconnect the telephones to establish the connections described above. In Figs. 1 and 2 only two such connecting circuits are shown; however, it is understood that as many connecting circuits as are required to meet the traffic conditions through the switchboard may be provided.

Also included in the switchboard and individual to each connecting circuit are switches such as S110 and S120 which are used by the attendant to extend a connection between her telephone and any of the terminating lines by way of the associated connecting circuits C110 and C120, respectively. Supervisory lamps such as L210 and L220 are provided on the same basis, any lamp being used to give visual indications of supervisory signals from lines interconnected by the connecting circuit with which the lamp is associated.

In the detailed description which follows, it is brought out that several sources of electrical current for operating transmitters, relays and the like are used. In all cases, these sources are 24 or 48 volt batteries, the positive plate of which is grounded and is hereinafter referred to as ground or (+) and the negative plate of which is extended as required to the various voltage sinks and is hereinafter referred to as battery or (−). Such batteries are located at the cordless switchboard, the central office, and the private automatic branch exchange. Signalling generators which produce 16 cycle per second or other low frequency signalling voltage, referred to hereinafter as signalling potential and symbolically as (±), are present at the central office and private automatic branch exchange and are extended into the equipment of the exchanges by means of suitable leads or wires.

In the cases of both the private automatic branch exchange and the central office, no detailed explanation of the switching technique is included in this description, since they do not form a part of the present invention.

In the detailed description which follows, reference is made only to connecting circuit C110, it being understood that the equipment functions in an identical manner when connecting circuit C120 is put to use in establishing connections of the type described.

DETAILED DESCRIPTION

Figure 1:
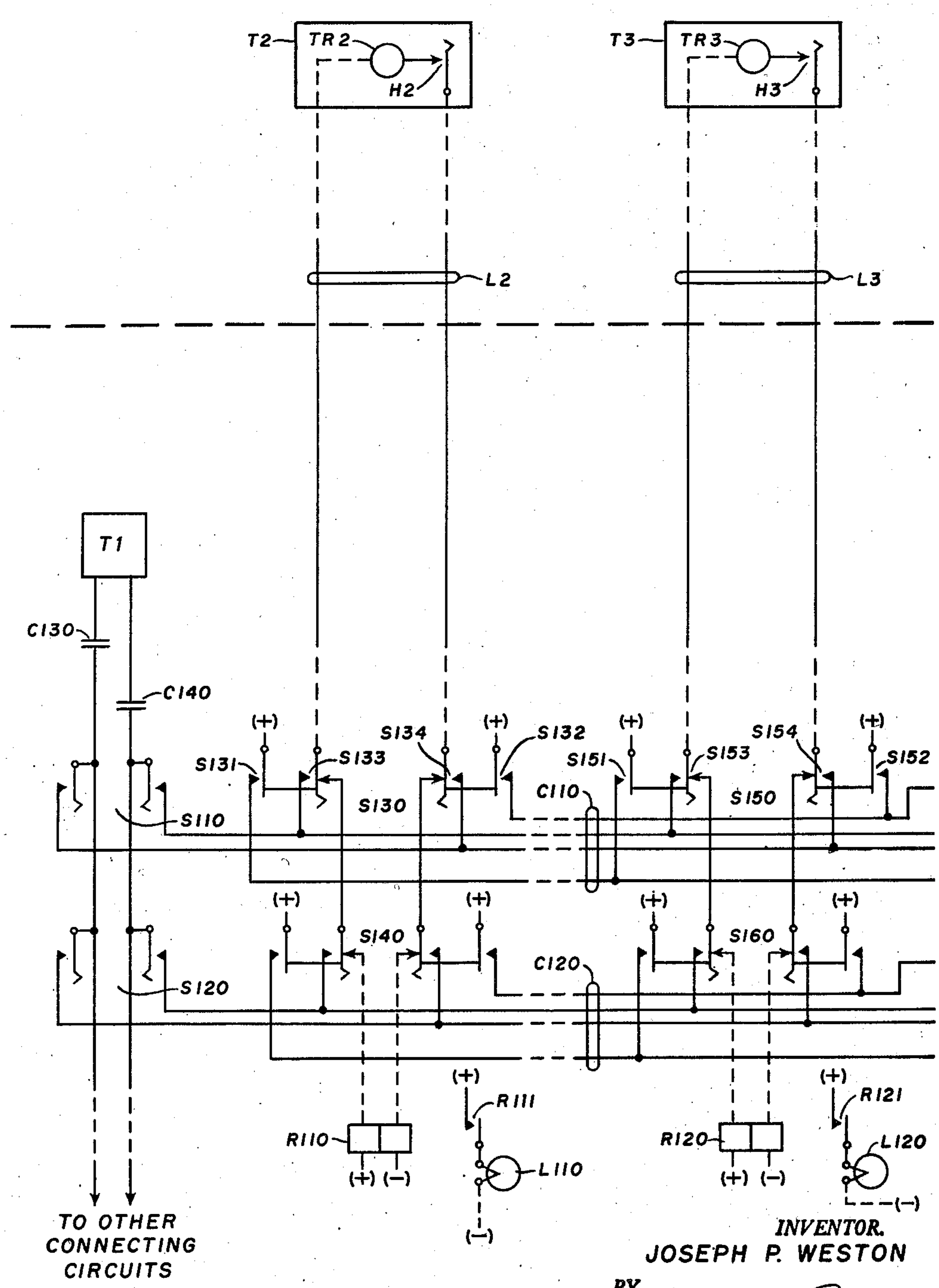
Figure 2:
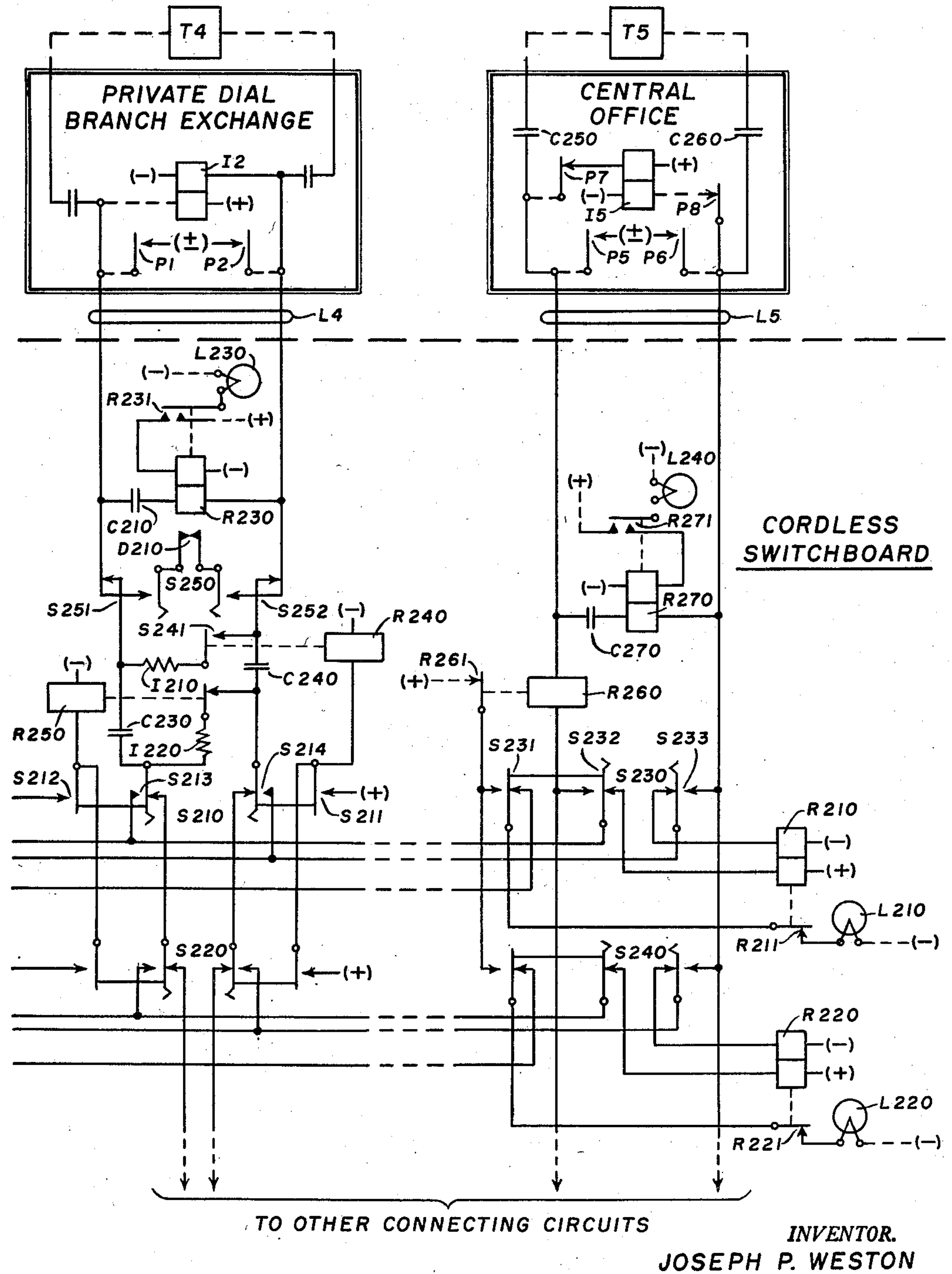

*Extension of a call from an extension line telephone T2 to another extension line telephone T3*

To originate a call through the private branch exchange switchboard, a subscriber at the telephone station lifts telephone T2 from its hookswitch, thus closing hookswitch contacts H2 to complete an obvious circuit by way of line L2 for energizing the operating windings of line relay R110 at the private branch exchange switchboard, and which is a part of the line terminating equipment. Line relay R110 operates to complete at contacts R111 a circuit for energizing line lamp L110 to indicate to the attendant at the switchboard that a call is incoming over line L2. The attendant selects an idle connecting circuit such as C110 and operates switch S110 to extend a connection from her telephone T1 to the talking conductors of connecting circuit C110, and operates switch S130 to further extend the connection at the make portion of contacts S133 and S134 to the two conductors of line L2. Opening of the break portions of contacts S133 and S134 on switch S130 disconencts the conductors of line L2 and station telephone T2 from its series relationship with the operating windings of relay R110 through which current for operating transmitter TR2 of station T2 has been supplied and, at the make portions of contacts S133 and S134 places the line in series with the talking conductors of connecting circuit C110 and the operating windings of supervisory relay R210. Relay R110 releases to open the energizing circuit of lamp L110.

Current flowing through the operating windings of relay R210 to the transmitter TR2 of the station T2 by way of line L2 is sufficient to operate relay R210 and thus open the contacts R211 on the relay.

It is to be noted that in extending the attendant's telephone T1 to the connecting circuit C110, the hookswitch (if there is one) of telephone T1 has no control over the operation of supervisory relay R210, because the presence of blocking capacitors C130 and C140 in series with the talking conductors of the connecting circuit prevents the flow of current from the operating windings of relay R210 through the attendant's telephone T1.

The operator having thus extended a connection from her telephone to the calling telephone to determine the requirements of the person at the extension station, restores switch S110 to its normal position to disconnect her telephone from the connection and proceeds to signal station T3 over line L3 in any one of a number of well known ways by means not shown or described since the signalling operation forms no part of the present invention.

Following the completion of signalling, the attendant operates switch S150 to disconnect at the break portions of contacts S153 and S154 the connection of the conductors of line L3 to the remainder of the terminating circuit and to connect at the make portion of the same contacts a connection from the line L2 to the talking conductors of connecting circuit C110. The extension telephone stations T2 and T3 are now interconnected and have their transmitters TR2 and TR3 in series relationship with the source of operating potential via the operating windings of supervisory relay R210. Thus the relay R210 is operated under the control of the hookswitch contacts H2 and H3 of stations T2 and T3, respectively, and remains so until both telephones are returned to their cradles and hookswitch contacts H2 and H3 are opened at the same time.

Operation of switches S130 and S150 causes contacts S131 and S151, respectively, to close to extend ground potential by way of a conductor in connecting circuit C110 through the break portion of transfer contacts S231 on switch S230 to the contact R211 on relay R210. Therefore, when operated relay R210 restores to normal following the hang-up operation of both extension telephones and the resulting opening of hookswitch contacts H2 and H3, an obvious circuit is completed for energizing supervisory lamp L210 to indicate to the operator that the call has been concluded.

In response to such supervision, the operator restores switches S130 and S150 to normal positions and thus frees the connecting circuit C110 for further use.

*Extension of a call between an extension line telephone T2 and private dial branch exchange telephone T4*

Extension of a call from an extension line telephone such as T2 is accomplished in the same manner as described in the above section on the extension of calls between two extension telephone stations insofar as signalling the operator and extending the atttendant's telephone to the calling line are concerned.

To respond to an incoming call from or to complete a call to the telephone station T4, the attendant operates switch S210 to close contacts S211 to supply ground to the operating winding of relay R240. Operation of relay R240 closes contacts R241 to complete a bridge comprising impedance I210 across the conductors of line L4. This bridge allows direct current to flow in the line loop from a source such as the impedance I2 located at the private dial branch exchange. In the case of an outgoing call, the flow of direct current causes the equipment at the private dial branch exchange to be seized; in the case of an incoming call, the flow of current causes the ringing equipment to trip out in the well known manner.

The talking conductors of connecting circuit C120 are extended to the talking circuit of line L4 by the operation of switch S210 at the make portions of contacts S213 and S214. The presence of blocking capacitors C230 and C240 in series with the talking circuit prevent the flow of direct current between the private dial branch exchange office battery and the cordless switchboard battery by way of the line L4 and the connecting circuit C120; the capacitors thus effectively divide the circuit into a switchboard end and the private automatic dial exchange end.

A brief summary of the equipment operation during the extension of calls from and to the private dial branch exchange is next given. The details of operation of the automatic exchange are omitted except as they pertain to the supervisory system in the cordless switchboard. To extend an outgoing call from the switchboard to the private branch exchange station T4, the attendant operates the dial cut-in switch S250 to transfer the conductors of line L4 by means of make portion of contacts S251 and S252 from the talking conductors leading to the exchange end of the connection to the pulsing contacts of dial D210. Repeated operation of the dial contacts D210 opens and closes the loop to the private automatic branch exchange office to cause equipment (not shown or described) in that office to be stepped in a manner well known in the telephone art, thus extending a connection from line L4 to the conductors of the line connected to station T4. The dial cut-in switch S250 is released at the conclusion of the dialing operation to remove the dial D210 from the line L4 and to restore the connection between the switchboard and private dial branch exchange ends of the circuit. Station T4 is signalled or rung automatically in a well known manner.

When the person at station T4 desires to be connected to the private branch exchange, removal of the telephone T4 and repeated operation of the dial at station T4 causes the switching equipment within the private dial branch exchange to be operated in any well known manner to extend a connection from the conductors of the line of telephone T4 to line L4. Signalling between the private dial branch exchange and the private branch exchange switchboard is accomplished by applying automatically signalling current to the conductors of line L4 in a manner represented symbolically by way of contacts such as P1 and P2. The signalling current to line L4 flows through blocking capacitor C210, and the operating winding of signal relay R230 to operate relay R230. Operated relay R230 establishes an obvious locking circuit for itself by way of its secondary winding and its own contact R231 and completes at contacts R231 an obvious circuit for energizing incoming signal lamp L230. The lighted signal lamp indicates to the operator that a call is standing in on line L4.

To extend the established connection between the switchboard and the telephone station T4, established as explained above, to an extension line telephone T2, the attendant operates switch S130 to complete at the make portions of contacts S133 and S134 a circuit between the talking conductors of connecting circuit C110 and the extension line telephone station L2 as explained in the previous section and thus completes an obvious talking connection between stations T2 and T4.

With switches S130 and S210 operated during the same time, a circuit is also completed at contacts S132 and S212 on switches S130 and S210, respectively, to extend ground to the operating winding of relay R250. The resulting operation of relay R250 opens at contacts R251 a bridge comprising impedance I220 across the talking conductors of the switchboard end of the line terminating equipment of line L4 which is used for purposes to be described presently for bridging between the talking conductors of connecting circuit C120. Thus, it is seen that the operation of relay R210 and, as a result, the energizing of supervisory lamp L210 are under the exclusive control of the hookswitch contacts at station T2 when the above-described connection has been established; it is further pointed out that the attendant at the private branch exchange switchboard receives no supervisory signals from the private dial branch exchange.

*Extension of a call between private dial branch exchange telephone T4 and central office telephone T5*

Extension of a call from the private dial branch exchange telephone T4 to the switchboard is accomplished in the same manner as described in the above section insofar as the establishment of the connection between the switchboard and the telephone station T4 is concerned.

To establish a connection between the talking conductors of the connecting circuit C10 and the central office telephone station T5 when the call is outgoing from the switchboard, the attendant operates switch S230 to complete an obvious connection between the talking conductors of the connecting circuit C110 and the conductors of line L5 at the make portions of the contacts S232 and S233. It is also to be noted that break portions of these contacts disconnect the operating windings of supervisory relay R210 from its previous connection to the talking conductor of connecting circuit C110 at this time. Thus it is seen that the transmitter current supply for any other telephone or for any bridge circuit between the talking conductors of the connecting circuit C110 is drawn over a loop comprising the battery feed impedance I5 located at the central office, closed contacts such as P7 and P8, conductors of line L5 (including the operating winding of relay R260 in series with one of the conductors), and the talking conductors of connecting circuit C110.

Assuming that the central office is of the manual type, the attendant at the manual office, signals a central office operator by virtue of direct current flowing in the above described loop over a circuit which is completed between the conductors of connecting circuit C110 which will be explained presently. The operator at the central office responds to the signal by connecting her telephone (not shown) to line L5 and in response to the number passed by the attendant, completes a connection to the line of and signals telephone T5. Following the answering of the signal at telephone T5, a talking connection exists between the manual switchboard and the telephone. No direct current signalling from telephone T5 is relayed to the cordless switchboard due to the presence of blocking devices such as capacitors C250 and C260 located in the central office equipment in series with the connection.

To establish a connection between telephone station T5 and station T4 through the private branch exchange cordless switchboard, removal of the telephone T5 from its cradle signals the central office operator in the well-known manner. The central office operator responds to such signals by connecting her telephone (not shown) to the line of station T5 and completes the requested connection by establishing a connection between the talking conductors of the calling line and the line L5. As in the call made from the switchboard, the presence of blocking devices such as capacitors C250 and C260 in the central office in series with the connection prevent the flow of direct current signals from the telephone T5 to the private branch exchange switchboard. In order to signal the private branch exchange switchboard, the operator at the central office applies signalling potential through make contacts such as P5 and P6 to the conductors of the called line L5. The resulting signalling current flows through the operating winding of relay R270 and the direct current blocking capacitor C270, to operate the relay. On operation, relay R270 locks in the operated position by way of its secondary winding and its own contacts to indirectly supplied ground. A circuit is also completed at the operated contacts R271 for extending ground to incoming signal lamp L240, thus energizing the incoming visual lamp L240 to indicate to the private branch exchange switchboard attendant that an incoming call is standing in one line L5. The operator responds to the call by operating switch S230 to extend the talking conductors of connecting circuit C110 to the conductors of line L5 as previously explained. By means not shown, the attendant also opens the path of ground supplied to the locking winding of relay R270 to release the relay and hence extinguish the incoming signal lamp L240.

With the call extended between telephone station L5 and connecting circuit C110 as explained above, the attendant at the cordless switchboard interconnects the lines of stations L4 and L5 by operating switch S210 associated with the line terminating circuit of the private automatic branch exchange line L4 at the make portions of contacts S212 and S214. The bridge comprising I220 placed between the talking conductors of the switchboard side of line L4 terminating circuit completes a loop from the central office comprising the talking conductors of the connecting circuit C110, the conductors of line L5, the operating winding of supervisory relay R260, break contacts such as P7 and P8 and the windings of the impedance coil I5 at the central office. Direct current flows from the battery and ground connections to impedance I5 through the loop and the operating windings of supervisory relay R260 which is in series with the loop to operate the relay and to open contacts R261.

Operation of switch S230 to extend line L5 to connecting circuit C110 also operates auxiliary contacts S231 to disconnect at the break portion of contacts S231 the circuit for energizing supervisory lamp L210 from the sources of ground at the switches S130 and S150 previously referred to and to connect at the make portions of the same contacts the lamp energizing circuit to a second source of ground which is controlled by the contacts of the supervisory relay R260 individual to the line terminating circuit of line L5. When the operator at the central office wishes to pass a supervisory signal to the attendant at the cordless switchboard, she interrupts the loop of line L5 by opening the loop at contacts such as P7 and P8 to interrupt the flow of current in the loop, thus releasing relay R260, and closing contacts R261. The closing of contacts R261 completes the obvious energizing circuit for supervisory lamp L210 to indicate to the attendant that the call requires her attention.

When the call has been completed, the attendant at the cordless switchboard restores switches S210 and S232 to their normal positions, thus freeing connecting circuit C110 for further action and restoring all of the previously operated equipment in the private branch exchange switchboard to its normal condition.

*Extension of a call between an extension line telephone such as T2 and a central office telephone T5*

Extension of connections between an extension line telephone such as T2 and the private branch exchange switchboard and between a central office station telephone T5 and the private branch exchange switchboard are accomplished in the manner described in preceding sections. When such connections have been extended to the same connecting circuit such as C110 during the same interval of time, a loop comprising transmitter TR2 and hookswitch contacts H2 at telephone station T2, the conductors of line L2, the talking conductors of connecting circuit C110, the conductors of line L5 including the operating winding of supervisory relay R260, the talking conductors of line L5 and the windings of impedance I5 at the central office is completed. Current for the transmitter TR2 at station T2 is supplied from the central office by way of the battery and ground sources connected to the windings of impedance I5. Thus it is seen that the hookswitch contacts at hookswitch H2 at telephone T2 and the loop interrupting means such as contacts P7 and P8 which are under the control of the central office operator control the flow of current through the loop. When either of the hookswitch contacts H2 or contacts P5 and P6 are opened, current ceases to flow in the line loop of line L5 and the series supervisory relay R260 releases to complete the energizing circuit of supervisory lamp L210.

As in the case of the previously described calls, the operator may take down such a connection and free the connecting circuit C110 for further use by restoring switches S130 and S230 to their normal positions.

*A conference connection between a plurality of extension telephone stations such as T2 and T3 and a plurality of private dial branch exchange telephones such as T4*

Setting up a conference connection involving the above enumerated telephones is carried out in the same manner as that described in the preceding section concerning the extension of calls between an extension station telephone T2 and a private dial branch exchange telephone station T4, except for the fact that in addition to operating switch S130 to extend telephone T2 to the connecting circuit C110, the attendant also extends a connection from one or more other extension telephone stations such as T3 and to other private dial branch exchange stations such as T4 to the connecting circuit C110 at the same time that the call between telephone stations T2 and T4 is set up. Under these conditions, the disabling relay R250 in each of the line terminating circuits of the private dial branch exchange lines such as L4 are jointly controlled by the ground connection extended from each of the several auxiliary contacts such as S132 and S152 on line circuit switches of extension line circuits such as S130 and S150 so that the bridge comprising impedance I220 placed across the talking conductors of connecting circuit C110 by the operation of relay R250 of each private dial branch exchange line involved in the conference is opened. With all such bridges open, the control of the operation of supervisory relay R210 is now under the joint control of hookswitch contacts H2 and H3 at stations T2 and T3, respectively.

At the conclusion of the call when the hookswitches of all the extension station telephones are opened by the return of the telephones to their cradles, relay R210 is released to complete a circuit by way of the path which includes the break portion of contacts S231 on switch S230 and the auxiliary make contacts such as S131 and S151 on line circuit switches such as S130 and S150 which are associated with the extension station lines which are joined in the conference to ground.

As in the previously discussed connection involving only the one extension telephone T2 and line L4, the connection is taken down by the attendant who restores to normal the switches of all the line circuits which were joined in the conference connection, thus releasing connecting circuit C110 for further use.

*A conference connection between a plurality of private dial branch exchange stations such as T4 and a central office telephone station such as T5*

Setting up a conference connection involving the above-enumerated telephones is carried out in the same manner as that described in the preceding section involving the extension of calls between a private dial branch exchange station T2 and a central office telephone station T5 except for the fact that in addition to operating switch S210 to extend line circuit L4 to the connecting circuit C110, the attendant also extends a connection from one or more other private dial branch exchange telephones (not shown in the drawing) to the connecting circuit C110 at the same time that the call between telephone stations T4 and T5 is set up. Under these conditions, the loop described in the preceding section which is completed by impedance I220 is now completed by the impedance I220 of each private dial branch exchange terminating circuit involved in the conference placed in parallel across the talking conductors of connecting circuit C110; so that supervisory relay R260 in the line L5 which is used to extend the call from connecting circuit C110 to central office station T5 controls at contact R261 the energization of supervisory lamp L210 at the cordless switchboard. At the conclusion of the call when the central office operator wishes to attract the attention of the attendant at the private branch exchange switchboard, the central office operator opens the loop of line L5 by means of contacts such as P7 and P8 at the central office to release relay R260, which in turn closes contacts R261 to energize lamp L210. Lamp L210, energized, indicates to the attendant at the private branch exchange switchboard that the call is completed.

As in the previously discussed connection involving only one private dial branch exchange telephone T2 and central office station telephone T5, the connection is taken down by the attendant who restores the switches of all the line circuits which are joined in the conference connection, thus restoring all equipment to normal condition and releasing connecting circuit C110 for further use.

*A conference connection between a plurality of extension telephone stations such as T2 and T3, a plurality of private dial branch exchange telephone stations such as T4, and a central office telephone station such as T5*

Setting up a conference connection involving the above enumerated telephones is carried out in the same manner as that described in the preceding section concerning the extension of calls between an extension station and a private dial branch exchange telephone station and the section concerning the extension of calls between a private dial branch exchange station and a central office station except as hereinafter noted. As pointed out before, when switch S230 of the line circuit of central office line L5 is operated, the switch transfers the talking conductors of connecting circuit C110 from the supervisory relay R210 operating windings to the conductors of line circuit L5 and the terminating circuit of line L5 at the central office. As in the case of the description of the connection between the extension station telephone T2 and the private dial branch exchange station T5, relay R250 associated with the line circuit of line L4 is operated to open the circuit comprising impedance I230 between the conductors of line L4, switchboard end of each such private dial branch exchange line circuit of each line such as L4 involved in the conference connection. It is pointed out that all auxiliary contacts such as S131 and S151 on line extension line circuit switches such as S130 and S150 are operated to control each of the disabling relays 250 of such lines leading to the private dial branch exchange as may be involved in the conference connection. It is also pointed out that should only one extension line telephone be involved in such a conference circuit and with more than one private dial branch exchange line, that the auxiliary contact of the one extension line station switch is used to supply operating ground for all of the disabling relays corresponding to R250 of each of the private branch exchange dial line terminating circuits.

As in the previously described conference connections, the present conference connection is taken down by the attendant who restores all of the line circuits which are joined in the conference connection to normal, thus releasing connecting circuit C110 for further use.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a telephone system, a plurality of lines divided into first and second classes; a switchboard; means for terminating each of said lines at said switchboard, said plurality of terminating means comprising first and second groups corresponding to said classes of lines; means comprising said terminating means operative for interconnecting any of said lines; supervisory signal means; means for energizing said signal means; means responsive to the operation of any one of said terminating means for controlling said energizing means; means associated with each of said terminating means in said first group for disabling the corresponding one of said supervisory signal controlling means; means comprising said interconnecting means of any one of said terminating means in said first group and of any one or more of said terminating means in said second group for jointly controlling the said disabling means associated with the said any one of said first group of terminating means.

2. The system of claim 1 wherein said interconnecting means of any number of said terminating means in said first group and said interconnecting means of any one or more of said terminating means in said second group jointly control each of said disabling means corresponding to the said any number of said first group of terminating means.

3. In a telephone system, a plurality of lines divided into first and second classes; a switchboard; line circuits for terminating each of said lines at said switchboard, said line circuits comprising first and second groups corresponding to said classes of lines, means in said line circuits for interconnecting said lines; a supervisory signal at said switchboard; a supervisory relay having contacts for controlling the energization of said signal; a circuit for energizing said supervisory relay; means in each of said line circuits for controlling said supervisory relay energizing circuit; a disabling relay associated with each line circuit of said first group of line circuits and having contacts for disabling the corresponding one of said supervisory relay controlling means; a circuit for energizing said disabling relay; means comprising said interconnecting means of any one of said first group of line circuits and of any one or more of said second group of line circuits for jointly controlling said energizing circuit of the each of said disabling relays associated with said any one of said first group of lines.

4. In a telephone system, a plurality of lines divided into first and second classes of lines; each of said lines comprising first and second conductors; a switchboard; line circuits for terminating each of said lines at said switchboard; said line circuits comprising first and second groups corresponding to said classes of lines; manually operated switches in each of said line circuits; contacts on each of said switches for interconnecting any of said lines; a lamp for indicating supervisory signals; a circuit for energizing said lamp; a supervisory relay having contacts for controlling said lamp energizing circuit; a circuit for energizing said supervisory relay; a bridge circuit between said conductors of said first group of line circuits; said contacts on each of said switches in said first group of line circuits for connecting said bridge or the corresponding line circuit to the energizing circuit of said supervisory relay to complete said supervisory relay energizing circuit, a disabling relay associated with each line circuit of said first group of line circuits and having contacts for controlling the opening and closing of said bridge circuit; an operating circuit for said disabling relay; auxiliary contacts on each of said switches in said line circuits in said first and said second groups of line circuits for jointly controlling said disabling relay operating circuit; said contacts and said auxiliary contacts on said switches of said line circuits in said first and said second groups of line circuits being arranged to energize the corresponding said disabling relays when any of said switches in said first group of line circuits and any of said switches in said second group of line circuits are operative to interconnect the corresponding said lines.

5. In a telephone system, a plurality of lines divided into a plurality of classes including first, second and third classes of lines; a switchboard; means for terminating each of said lines at said switchboard; said terminating means comprising a plurality of groups including first, second and third groups corresponding to said first, second and third classes of lines, respectively; means comprising said terminating means for interconnecting any number of each of said first and second classes of lines and no more than one of said third class of lines; supervisory signal means ot said switchboard; first and second means for energizing said supervisory signal means; first and second means responsive to the operation of the interconnecting means of any one of said first and any one of said second groups respectively for controlling said first and second energizing means; said first and second controlling means normally controlling said first energizing means; means responsive to the operation of any one of said terminating means of said third group for rendering said first energizing means inoperative and said second energizing means operative; means associated with each of said terminating means of said first group for disabling the corresponding one of said controlling means individual to each of said first group of terminations; means comprising said interconnecting means of any of said first group and any one of said second group for jointly controlling said disabling means corresponding to said any of first group of terminating means.

6. The telephone system of claim 5 wherein any number of said terminating means in said first group and any one or more of said terminating means in said second group jointly control each of said disabling means corresponding to the said any number of said first group of terminating means.

7. In a telephone system, a plurality of lines divided into a plurality of classes including first, second and third classes of lines; a switchboard; line circuits for terminating each of said lines at said switchboard, said line circuits comprising a plurality of groups including first, second and third groups corresponding to said first, second and third classes of lines, respectively; means comprising said line circuits for interconnecting any number of each of said first and second classes of lines and no more than one of said third class of lines, a supervisory signal at said switchboard; a first supervisory relay; a plurality of second supervisory relays, each of said second relays being individual to each of said line circuits of said third group; means comprising contacts on each of said supervisory relays for controlling the energization of said supervisory signal; first and second means operative responsive to the operation of any one of said interconnecting means of said first and any one of said interconnecting means of said second groups, respectively, for controlling said first and second supervisory relays; said first and second controlling means normally controlling said first supervisory relay; means comprising said interconnecting means of any line circuit of said third group for rendering said first supervisory relay inoperative and the corresponding one of said second supervisory relay operative; a disabling relay associated with each of said line circuits of said first group, contacts on each of said disabling relays for disabling the corresponding said first controlling means; means comprising said interconnecting means of any of said line circuits of said first and any of said second groups for jointly controlling said disabling relay in each of said any of said first group of line circuits.

8. In a telephone system, a plurality of lines divided into first, second and third classes, each of said lines comprising first and second conductors; a switchboard; line circuits for terminating each of said lines at said switchboard, said line circuits comprising first, second and third groups corresponding to said first, second and third classes of lines, respectively; manually operated switches in each of said line circuits, contacts on said switches operative for interconnecting any number of each of said first and second classes of lines in combination with no more than one of said third class of lines; a supervisory lamp at said switchboard for indicating supervisory signals from said second and third classes of lines; first and second circuits for energizing said lamp; a first supervisory relay; a plurality of second supervisory relays individual to each of said line circuits of said third group, contacts on said first and second supervisory relays for controlling said first and second energizing circuits, respectively, a bridge circuit between the conductors of said first group of line circuits, said contacts on each of said switches in said first group of line circuits for normally connecting said bridge of the corresponding line circuit to said first supervisory relay to complete said first supervisory relay energizing circuit, said contacts on each of said switches in said second group of line circuits for connecting said conductors of the corresponding line to said first supervisory relay energizing circuit, said contacts on each of said switches of said third group of line circuits for opening said first supervisory relay energizing circuit and for closing circuits between said bridge and said second class of line circuit to said second relay energizing circuit, a disabling relay associated with each of said first group of line circuits, contacts on each of said disabling relays for controlling the opening and closing of the corresponding said bridge circuit, an operating circuit for each of said disabling relays, auxiliary contacts on each of said switches of said first and said second classes of line circuits for jointly controlling said disabling relay operating circuit, said contacts and said auxiliary contacts on any of said switches of said first and second groups of line circuits being arranged to energize the corresponding said disabling relays of said first group of line circuits when any of said switches in said first group of line circuits and any number of switches in said second group of line circuits are operative to interconnect the corresponding lines of said first and said second classes.

References Cited in the file of this patent

UNITED STATES PATENTS

| | | |
|---|---|---|
| 2,367,634 | Wicks et al. | Jan. 16, 1945 |
| 2,613,281 | Micha | Oct. 7, 1952 |